United States Patent [19]

Walton

[11] Patent Number: 5,329,879

[45] Date of Patent: * Jul. 19, 1994

[54] CAT WASTE ELIMINATION SYSTEM INCLUDING ANTI-LITTER SPREADING AND CONTAINMENT DEVICE AND ALSO INCLUDING A DEVICE ALLOWING WALKING KITTENS TO SAFELY ENTER A KITTY LITTER BOX

[76] Inventor: Robert W. Walton, 4 Chapel Street South, Thorold, Ontario, Canada, L2V 3Y7

[*] Notice: The portion of the term of this patent subsequent to Mar. 16, 2010 has been disclaimed.

[21] Appl. No.: 25,121

[22] Filed: Mar. 2, 1993

Related U.S. Application Data

[63] Continuation-in-part of Ser. No. 793,126, Nov. 8, 1991, Pat. No. 5,193,488.

[51] Int. Cl.⁵ .............................. A01K 1/01
[52] U.S. Cl. .................... 119/166; 119/165; D30/112; D30/119
[58] Field of Search .................. 119/161–170, 119/15, 16, 17, 19, 21; D30/108, 112, 119

[56] References Cited

U.S. PATENT DOCUMENTS 4,444,148  4/1984  Lander ........................... 119/165

FOREIGN PATENT DOCUMENTS 3093      7/1979  European Pat. Off. ........... 119/170
3028579   2/1982  Fed. Rep. of Germany ...... 119/166

Primary Examiner—John G. Weiss
Attorney, Agent, or Firm—Wallace F. Neyerlin

[57] ABSTRACT

An anti-litter spreading and containment device for pet animals is disclosed. It consists in a fence-like structure which substantially surrounds and sits atop almost the entire perimeter of the animal's waste collection container.

The invention also includes a device which is of utility in overcoming the difficulty experienced by small kittens in using cat waste boxes, said device consisting in a ramp-like walkway which leads to the top border of the waste collection container.

12 Claims, 6 Drawing Sheets

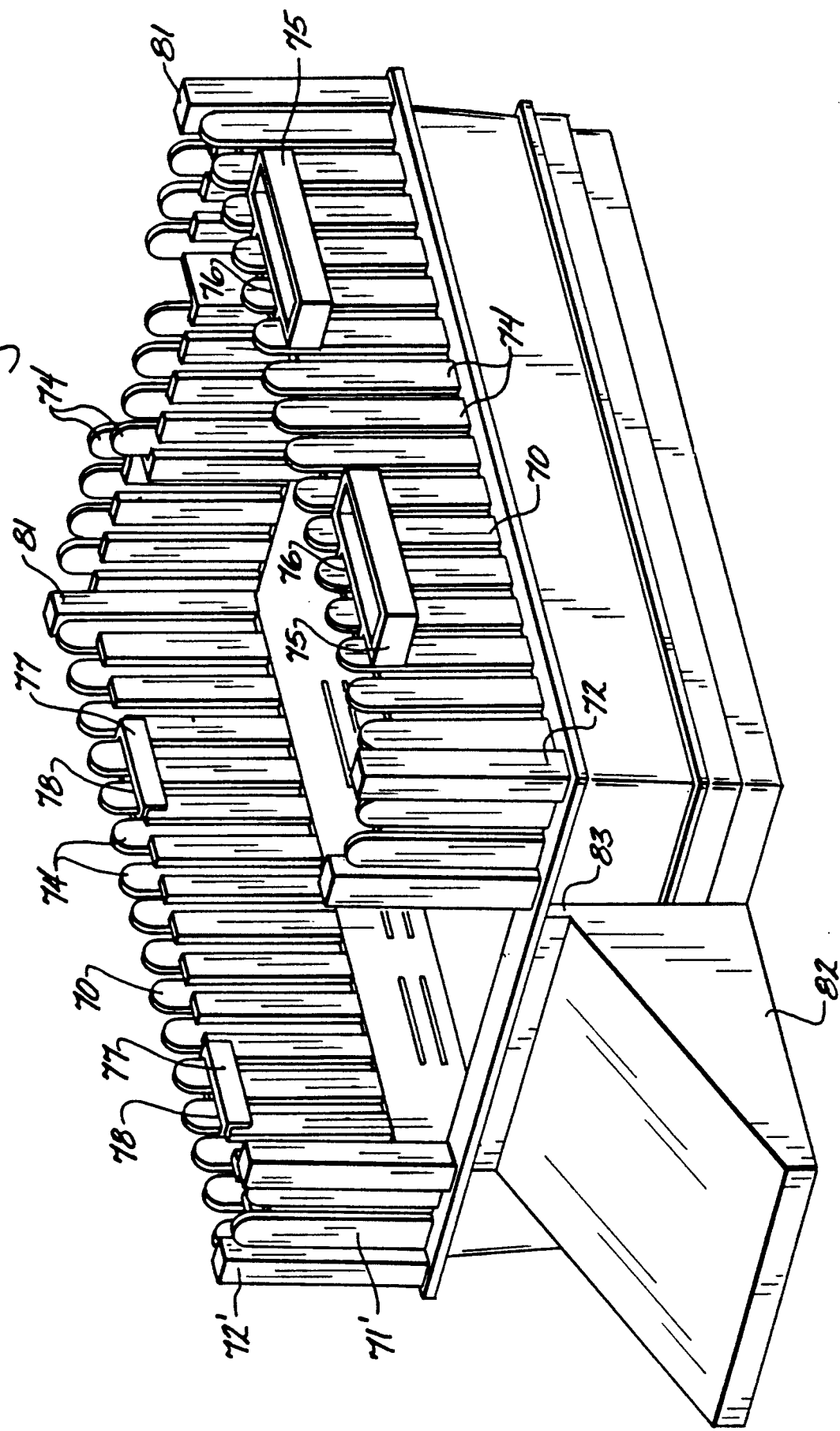

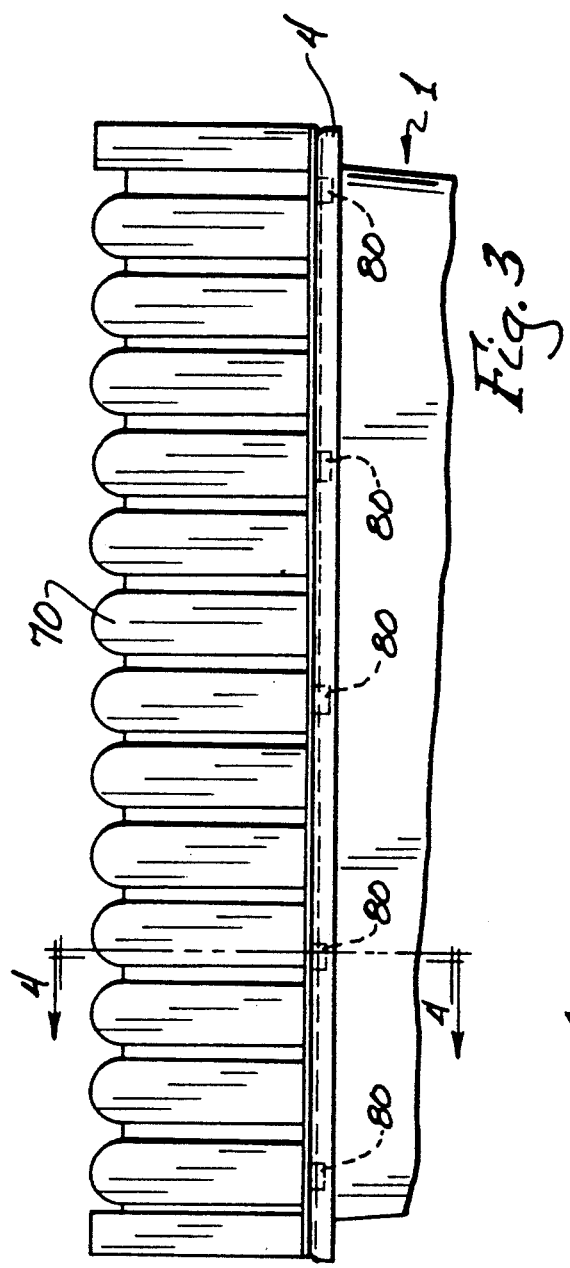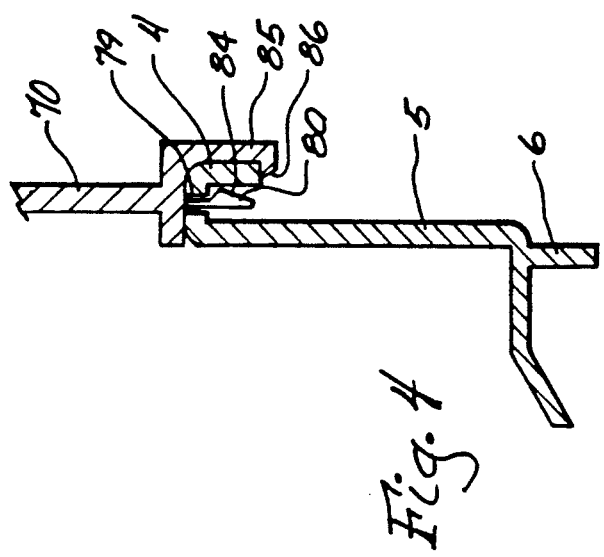

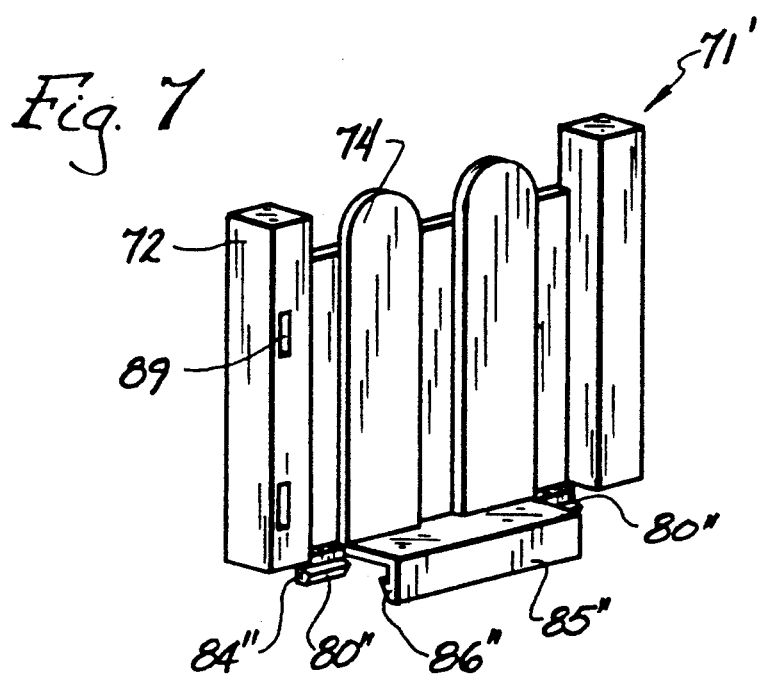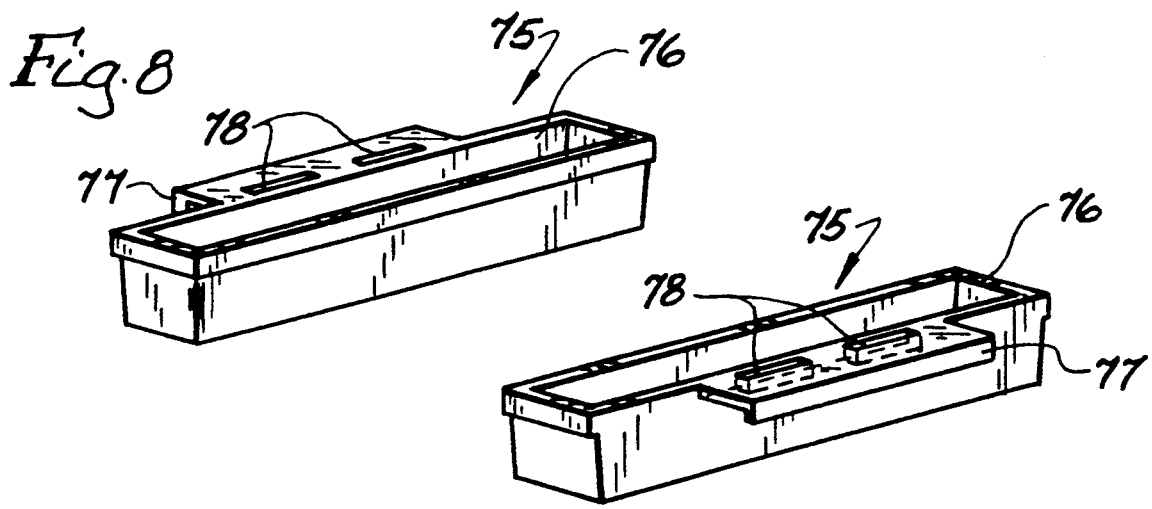

CAT WASTE ELIMINATION SYSTEM INCLUDING ANTI-LITTER SPREADING AND CONTAINMENT DEVICE AND ALSO INCLUDING A DEVICE ALLOWING WALKING KITTENS TO SAFELY ENTER A KITTY LITTER BOX

This application is a Continuation-in-part of my prior Patent Application entitled "Cat Waste Elimination System," Ser. No. 07/793,126, filed Nov. 18, 1991 and issued Mar. 16, 1993 as U.S. Pat. No. 5,193,488.

FIELD OF THE INVENTION

Animals while using waste systems involving litter or granules, newspaper, corn, peas, sand or any material in which to urinate or defecate often scratch and displace this material out of the waste management box to the surrounding area. The anti-litter spreading and containment device described in this application is designed to eliminate or minimize this undesirable and messy common occurrence.

BACKGROUND OF THE INVENTION

The spreading of ammoniated and fecal infested waste absorbent material from an animal waste box, as referred to above, is a common but undesirable occurrence which happens in millions of American homes as well as in the homes of many foreign countries. The anti-litter spreading and containment device of the present invention is designed to greatly reduce or to eliminate the problem of this waste material being scattered about by animal movement after urination and defecation.

Another problem addressed by a different embodiment of the present invention is that of overcoming the difficulty experienced by small cats or kittens, once weaned by their mothers, of being able to be trained to use most commercially produced cat waste boxes by devising a device which will accomplish this objective.

SUMMARY OF THE INVENTION

The aforementioned briefly described inventions have primary usage in connection with and/or as adjuncts with the dry cat waste elimination system described and claimed in my prior patent application referred to above.

The anti-litter spreading and containment device or means referred to consists in or comprises a fence-like structure which substantially surrounds and sits atop almost the entire perimeter of the cat waste "box" employed in my prior invention.

The device which is of utility in overcoming the difficulty experienced by small kittens in using cat waste boxes consists in or comprises a ramp-like structure or walkway which leads to the top border of the cat waste "box" of my prior invention.

These two new developments of the present invention are now described in reference to the following drawings which illustrate the various details of my invention.

BRIEF DESCRIPTION OF THE DRAWINGS

FIG. 2 is a perspective view of the improved device of the present invention which incorporates both the fence-like structure and ramp structure referred to above:

FIG. 3 is a partial side view of the tray assembly with a side fence coupled to the top of same;

FIG. 4 is a section view taken across cut line 4—4 of FIG. 3;

FIG. 7 is a perspective view of the front left-side fence;

FIG. 8 is a perspective front view of a flower box which may be used for adornment or aesthetic purposes in the present invention; and FIG. 9 is a perspective back view of the flower box.

DETAILED DESCRIPTION OF THE DRAWINGS AND THE PREFERRED EMBODIMENTS

Figure 1:
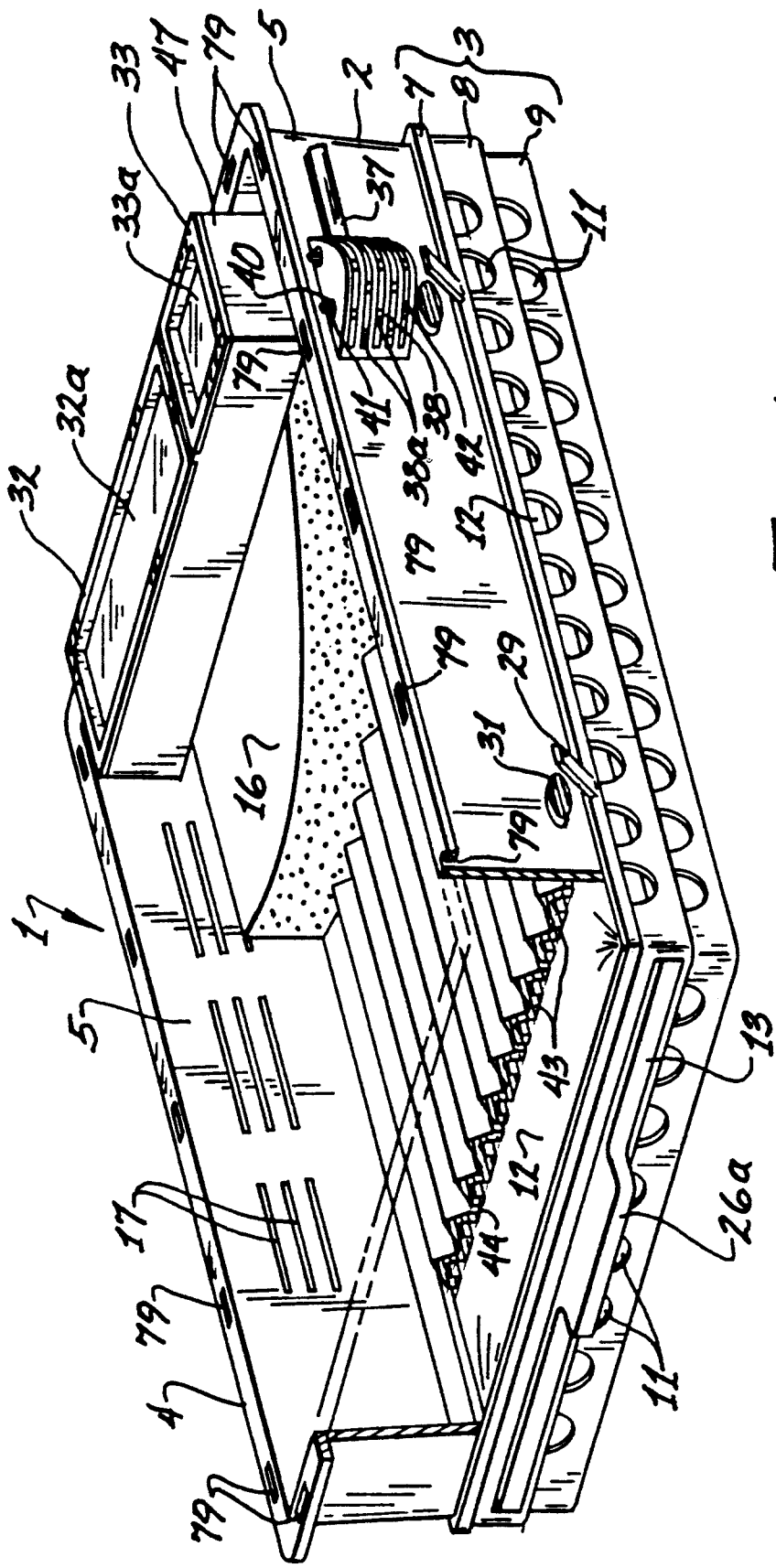
FIG. 1 is a perspective view of the preferred embodiment of the entire assembly of the cat waste elimination system of my prior co-pending application and is identical with FIG. 1 of that application except for the introduction of numerous slots 79 in the top surface of the top wall 4 of the box.

In the drawings the entire preferred assembly of the prior application (rectangular in shape preferred) is illustrated in FIG. 19 and is designated by the numeral 1. The entire assembly includes an upper or top tray compartment 2 and a bottom or lower tray assembly compartment 3. The upper tray compartment possesses a circumferential lip 4 all around its perimeter into which rim or lip numerous slots 79 are formed for insertion of bottom tabs 80 of portions of the fence; and a rim or legs 6 (FIG. 4) which separates the upper tray compartment 2 from the lower tray assembly 3. The upper tray possesses sides 5 around same which sides are almost but not quite vertical. The upper tray or box will typically have dimensions of 14"×20–22"×5 ¼", and has several unique features: a pervious bottom to allow direct filtration of the cat's urine; a retardant spill ring on the inside to help keep the sand or gravel or granular material inside the box; and litter indicator rings or depth markers 17 for the correct balance of particulate material to be put in the box. It preferably also possesses several points of connection on the box for additional accessories such as slots 79 as are employed in the present invention. The lower assembly compartment 3 is a holder of the tray 13 that holds the liner pad or tablet in the prior application. This lower assembly compartment 3 has approximately 64 aeration holes or openings 11 in the sides and ends which match up in upper and lower sections of the bottom compartment. The purpose of these holes is to allow the liner or tablet to receive aeration and in doing so dry the urine out of the liner used in the prior application (and which may also be used in connection with the present invention), allowing the liner to be re-used several times over. This bottom tray assembly compartment is preferably plastic pressure clip fastened to the upper "flow-through" main tray but may be connected to same in any suitable manner.

FIG. 1 illustrates an embodiment where at the end shown only the lower section 9 of the bottom compartment contains aeration holes 11; whereas at the side shown, both the tipper (8) and lower (9) sections of the bottom compartment contain aeration openings which match up vertically. FIG. 19 illustrates 32 such aeration holes, 24 in the side shown and 8 at the end shown, thus indicating that the opposite side and end also possess 32 aeration holes so as to account for the total of 64 aeration openings referred to above. Although aeration openings on each of the sides and each of the ends are preferred for maximum aeration and drying effects, it is also obvious that the invention can be carried out with less preferred results where only one end of the bottom tray assembly possesses such aeration openings.

There is also a drawer-like tray 13 that fits into the bottom assembly compartment 3 which bottom compartment 3 is clipped or fastened to the upper compartment 2 and which tray is for the purpose of supporting liner tablet 12. This tray 13 is removable for the purpose of simplicity of removing the urine collecting liner tablet. The lower assembly compartment 3 is preferably of only one-piece construction but comprises an upper section 7, a middle section 8 and a bottom section 9, the holes 11 in sections 8 and 9 being in vertical alignment preferably all around the perimeter of the assembly and/or at two sides and one end thereof.

All three parts, top compartment 2, the bottom compartment 3 and the drawer tray 13 make up the main pet waste elimination system construction of my prior invention, all of which are typically made of rigid plastic. The drawer 13 is designed with a lip around the inside to sustain the support of the urine tablet liner 12. The drawer tray also has six small pillars which line up with "buttons" of the liner and which further support the liner 12 so as to allow for a pattern of equal squares on the tablet or liner for support. As aforesaid, the upper section of lower compartment 3 is designated by the numeral 7, the center section by 8 and the bottom section by 9. The sections 8 and 9, and the drawer tray 13 which is slidably contained within center section 8, are structurally coordinated and designed so that the vertically aligned holes 11 provide ample aeration both to the top and bottom of the liner pad; which holes (for ease of manufacturing purposes using commercial plastic forming techniques and procedures which are the most competitive economically,) are typically semi-circular in shape as shown in FIG. 1.

As taught in my prior application, the sides of upper section 7 of lower compartment 3 posses slots to facilitate entry of locking tabs into same. Locking tabs are located in the sides of leas of upper tray 2. The tabs may be provided with unlocking levers to facilitate easy disassembly of the trays. Such levers may also be provided with stiffening webs for structural strength and product longevity.

The bottom of top compartment 2 may also be reinforced with support straps which run longitudinally and transversely. Sand and/or gravel and/or kitty litter material 16 is supported by the bottom of top compartment 2 and the amount of same used and/or desired for use is ascertainable by depth marker lines 17 in the interior sides of upper compartment 2. Drawer tray 13 for the absorbent liner or pad or tablet 12 of my prior invention is of intersecting grid design with tray posts and a tray stop. Pad 12 possesses a pad lip around its perimeter for support on the perimeter of tray 13; and also pad "buttons" for support on the tray posts. Drawer tray 13 also preferably possesses a handle end 26a with "finger" slots for gripping the tray for periodic removal as desired.

As previously stated, the trays of this invention may be constructed with slots and locking tabs and other locking members such as may be employed in connection with ally of the various tray members to enable or facilitate their easy assemblage and/or disassembly, but should not be construed as limiting as to means which may be employed for such functions. In the present invention slots 79 and tabs 80 are preferably employed.

Upper compartment 2 also preferably possesses user friendly "finger pads" located near the unlocking levers and stiffening webs to facilitate ease of assemblage and disassembly of the compartments 2 and 3 with or from each other.

The aeration of the entire bottom of the feline waste container of the invention of my prior application is designed for the express purpose of not only eliminating odor but to dry the urine and in doing so to provide a higher degree of sanitation than any other similar system. The aeration even dries the bottom of the top compartment tray which contains the particulate material that the feline frequently scratches for burial of the fecal waste, thus allowing air to rise through the sand or other granular material contained therein. The system thus allows both top and bottom air movement to be absorbed on the floor of any home by simple drafts of heating, air conditioning or body movement.

As previously indicated, the design of FIG. 1 is a preferred embodiment over that of FIG. 4 of my prior application, although both designs are operative and novel with my previous invention. Although only the FIG. 1 embodiment of my prior application is described in reference to the invention of this application, it should be understood that the improvements of this application are equally combinable with the FIG. 4 embodiment of my prior application.

The bottom of the upper tray compartment of FIG. 19 is designed so as to keep a layer of granules covering the escape urine longitudinal slot holes 44 in the valleys of the tray compartment. The bottom of the tray consists of a number of longitudinal V-shaped valleys and inverted V-shaped bars joined by bar separators 43. The number of these longitudinal V-shaped valleys and inverted V-shaped bars is variable but may typically be a total of about fourteen of each for a waste assembly system having the dimensions previously referred to. This preferred structure keeps the felines from reaching the bottom of the upper tray compartment through the granules and minimizes the catching of their claws on or in the slot holes 44. Because of this "V" and inverted V configuration of the bottom and the inability of the granular material (of appropriate size so as to provide channeling of the urine through same) the V configuration allows for the granular material to protect the holes from being blocked on the urine's route to the tablet in the lower tray assembly.

About seven to nine longitudinal slot holes 44 are employed in each of the V-shaped valleys shown in the bottom of the tray. Typically, any such top tray compartment of a waste elimination system having a top tray compartment design of my prior application or of this invention as illustrated in FIG. 1 will have at least a set of sixty or more such elongated holes in the bottom thereof.

In FIG. 2, numeral 70 denotes side-fence sections of equal length on each side of the cat waste box: numeral 71 denotes a fence section on the right side of the end of the box which is open; numeral 71' denotes a fence section on the left side of the same end; numeral 72 denotes a corner post on the right side of the same end; numeral 72' a corner post on the left side of the same end; numeral 73 denotes an inner end post on the right side of the open end of the box and numeral 73' denotes an inner end post on the left side of the open end of the box.

In the same Figure, numeral 74 denotes the rounded ends of all of the boards having such ends; numeral 75 denotes decorative flower boxes which may be attached to the cat box for ornamental or aesthetic attractiveness and numeral 76 designates real or artificial flowers which may be bedded in same. Numeral 77 designates various braces which may be utilized in conjunction with the fence sections to help provide structural rigidity for the litter retention walls sitting atop the litter box or cat waste elimination system of my prior copending application. Numeral 78 (in FIGS. 8 and 9) designates slots in appendages or braces 77 for the flower box for attaching the ornamental flower boxes to the tops of the posts of the fence sections.

In FIG. 3, numeral 80 designates tabs 80 on some of the posts of side fence section 70 which tabs fit into slots 79 (of FIG. 1). Details of structural construction are made clearer from reference to FIG. 4 wherein numeral 70 again designates a side fence section, numeral 4 the top border of the box, numeral 5 the wail of the box, numeral 6 the lower rim or legs of the upper tray compartment, numeral 79 a slot in the box, numeral 80 a tab on the fence, numeral 84 a locking hub on tab 80, numeral 85 a lock-over piece on the fence and numeral 86 a locking tab on lock-over piece 85.

Lastly, with further regard to FIG. 2, the numeral 81 designates corner posts on the closed end back fence; 82 designates a walk-up ramp for a small kitten to enter the waste box; and 83 designates a locking ridge at the top of the ramp which may suitably be fitted with tabs (not shown) to be inserted into slots in the top edge of the box (also not shown) in a manner as previously described in reference to attaching the fence sections to the top of the box.

Figure 5:
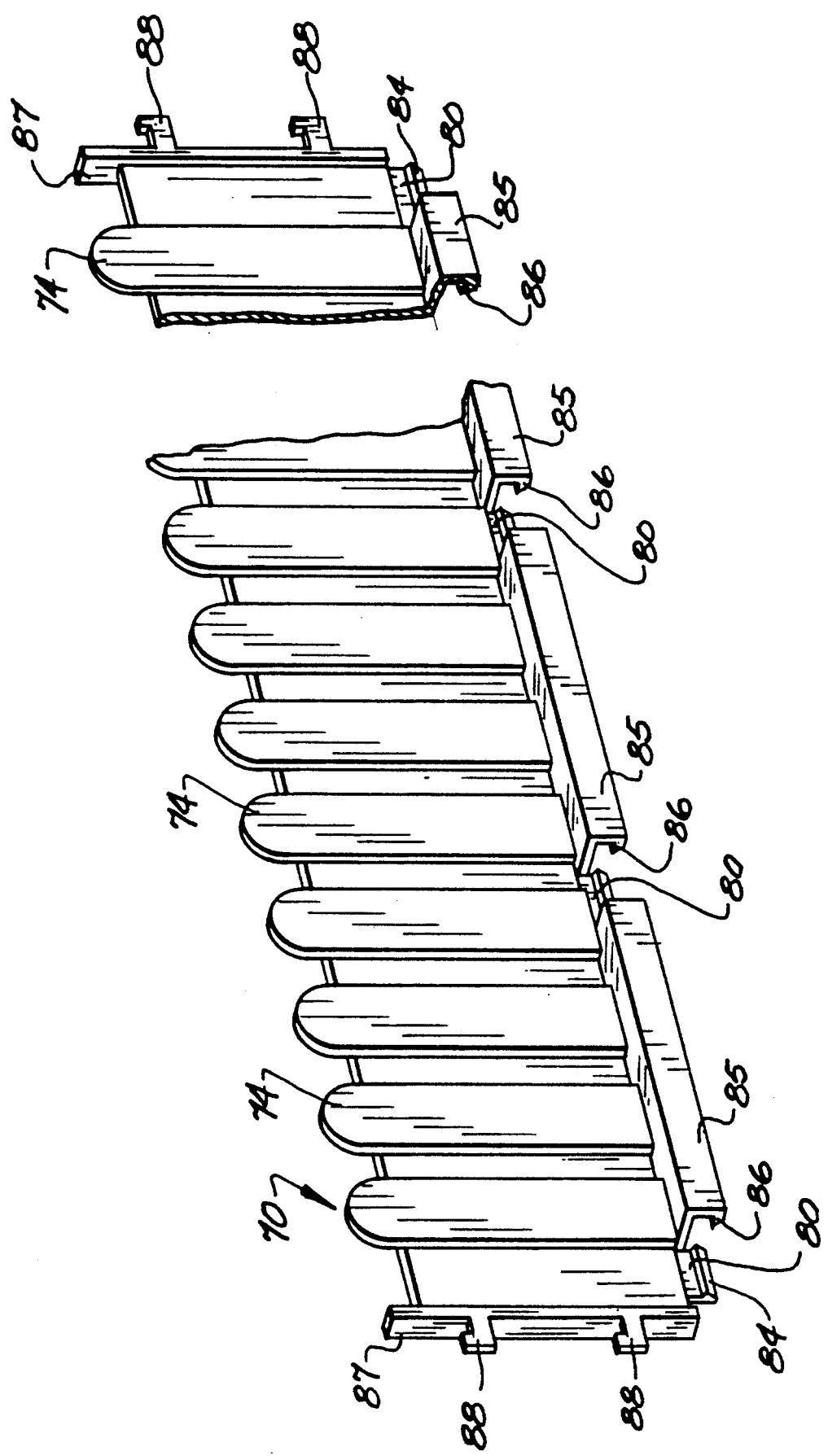
FIG. 5 is a perspective view of the side fence (broken for ease in describing same in detail)

In FIG. 5, what the numerals 70, 74, 80, 84, 85 and 86 refer to have been previously described. Numeral 87 depicts side posts at the ends of each of the side fences of the device, said side posts having locking tabs 88 on same to facilitate connecting the side fences to the back and front end fences of the device, such as by being inserted into slots 89 in corner posts 72 or 72' (as illustrated in FIG. 7) or into similar slots (not shown) in end posts 73 and 73' and/or in corner posts 81 in the back fence.

Figure 6:
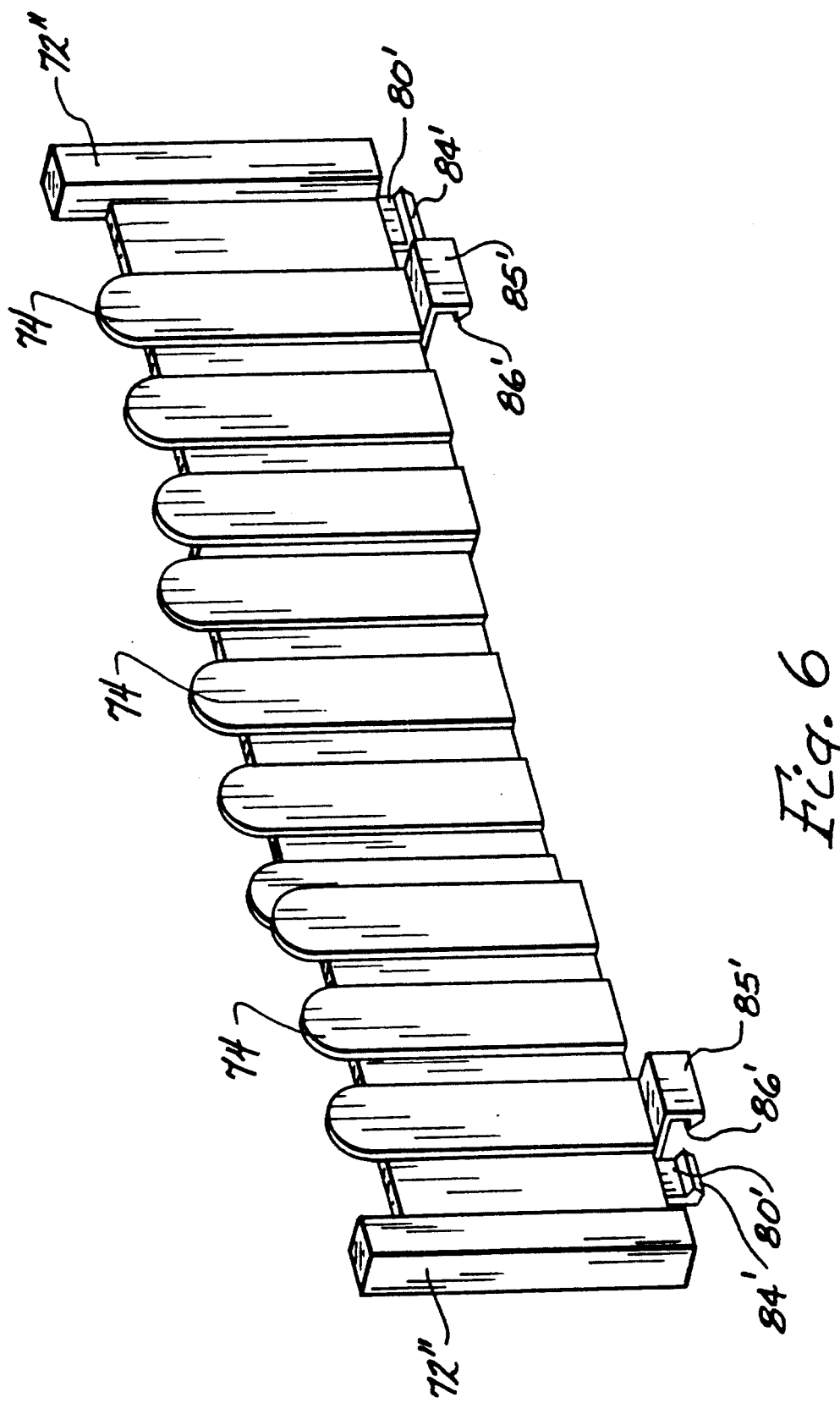
FIG. 6 is a perspective view of the back fence.

The same numbers (primed) stand for the same structural members in FIG. 6 of the back fence; and also for the same structural members (but double primed) in FIG. 7 which illustrates the front left end fence.

Lastly, in FIGS. 8 and 9, numeral 75 depicts an optionally employed flower box, numeral 76 for flowers that may be placed in the box, 77 a brace for attaching the flower box to the fence and 78 for slots for overhanging the flower box on the top of the fence posts.

As previously indicated, the rectangular assembly of my prior invention typically had dimensions of about fourteen inches wide and twenty to twenty-two inches long. Assuming such dimensions in the case of the present invention, this means that the side fences would be about 20 to 22 inches long, the back fence 14 inches wide and the front partial fences each about 4 inches wide, leaving the open space (or the width of the ramp) about 6 inches wide. The height of the fence is typically about 5½ to six inches. As previously pointed out, these fence pieces greatly reduce the spreading of the waste collection material used in the waste containers of my prior invention; or of conventional litter boxes suitably modified in construction to permit the addition of my fencing on top of same and/or the abutment or attachment of my ramp to same.

As previously indicated and illustrated, the fence material, be it plastic, tin, iron, or wood, etc. is so designed to almost completely encase around the top of the upper wall of an animal waste collection container, except for allowing for a space for the cat or kitten to enter and exit.

It is designed to eliminate this waste material from being scattered about by animal movement after urination or defecation.

Without this invention, animals can spread this contaminated waste material all over the floor, then proceed to walk in it when exiting the waste containment box, where it in turn can be tracked and deposited around the home or location of this waste box. In doing so, the house or location can be contaminated with bacterial material.

In so doing, this bacterial waste is further tracked and can be picked up on the hands of little children who are still crawling upon the floor. With this invention there will be a complete elimination or almost total elimination of this phenomena.

With further regard to the ramp-like walkway of the present invention, this embodiment is for the purpose of allowing ingress and egress of walking kittens (about 4 weeks and up) to safely enter and exit a kitty litter box. Small cats, once weaned from their mothers need to be trained to use a commercially produced cat waste box. This process proves to be difficult if not impossible for small cats as they cannot climb into the box. This "Kitty Ramp" of the present invention with a textured surface, on an easy slope provides a safe and convenient way for kittens to access the cat waste box early, lessening their inclination to expel bodily fluids and fecal matter in other locations causing strain to the owner and ultimately to the cat. The Kitty Ramp allows mother to train the kittens to the cat waste box as early as possible.

The foregoing description and embodiments are intended to illustrate the invention without limiting it thereby. It will be understood that various modifications can be made in the invention without departing from the spirit or scope thereof.

I claim:

1. An anti-litter spreading and containment device comprising in combination:
   a. a substantially rectangular top tray compartment;
   b. a substantially rectangular bottom tray assembly;
   c. a granular material on the bottom of the top tray compartment; and
   d. a fence surrounding almost completely the top of the top tray compartment except for a space in the fence for the animal to enter and exit: and wherein said top tray compartment possesses a bottom configuration consisting of a multiplicity of V-shaped valleys and inverted V-shaped hills, the bottom of said valleys possessing a multiplicity of longitudinal holes, said bottom capable of supporting the granular material in which that cat waste is to be deposited, the longitudinal holes in the bottom valleys being of sufficient number and size to permit passage therethrough of the cat's urine but also being sufficiently limited in size so as to be capable of supporting most or substantially all of the granular material which is placed atop some without permitting passage through the holes of said bottom valleys; and wherein said bottom tray assembly possesses aeration openings in its sides and in at least one of its ends to assists in evaporation of the cat's urine deposited upon the granular material contained in said top tray compartment.

2. An anti-litter spreading and containment device according to claim 1, including an inclined ramp in front of the waste collection container at a location opposite the space in the fence where the animal enters and exits the waste collection container.

3. An anti-litter spreading and containment device according to claim 1 including at least one flower box attached to the fence.

4. An anti-litter spreading and containment device according to claim 2 including at least one flower box attached to the fence.

5. An anti-litter spreading and containment device for pet animals comprising in combination:
   a. a substantially rectangular top tray compartment;
   b. a substantially rectangular bottom tray assembly;
   c. a granular material on the bottom of the top tray compartment; and
   d. a fence surrounding almost completely the top of the top tray compartment except for a space in the fence for the animal to enter and exit; and wherein said top tray compartment possesses a screen in the bottom thereof for supporting the granular material in which the cat's waste is deposited and through which screen and granular material the animal's urine passes; and wherein said bottom tray assembly possesses aeration openings in its sides and in at least one of its ends to assist in evaporation of the cat's urine deposited upon the granular material contained in said top tray compartment.

6. An anti-litter spreading and containment device according to claim 5 including an inclined ramp in front of the waste collection container at a location opposite the space in the fence where the animal enters and exits the waste collection container.

7. An anti-litter spreading and containment device according to claim 5 including at least one flower box attached to the fence.

8. An anti-litter spreading and containment device according to claim 6 including at least one flower box attached to the fence.

9. An anti-litter spreading and containment device for pet animals comprising in combination:
   a. a substantially rectangular top tray compartment;
   b. a substantially rectangular bottom tray assembly;
   c. a granular material on the bottom of the top tray compartment; and
   d. a fence surrounding almost completely the top of the top tray compartment except for a space in the fence for the animal to enter and exit; and wherein said top tray compartment is pervious but supports the granular material on its bottom;
   wherein said top tray compartment possesses a set of at least 60 elongated holes in its bottom and through which holes and granular material the animal's urine passes, and wherein said bottom tray assembly possesses aeration openings in its sides and in at least one of its ends to assist in evaporation of the cat's urine deposited upon the granular material contained in said top tray compartment.

10. An anti-litter spreading and containment device according to claim 9 including an inclined ramp in front of the waste collection container at a location opposite the space in the fence where the animal enters and exits the waste collection container.

11. An anti-litter spreading and containment device according to claim 9 including at least one flower box attached to the fence.

12. An anti-litter spreading and containment device according to claim 10 including at least one flower box attached to the fence.

* * * * *